UNITED STATES PATENT OFFICE.

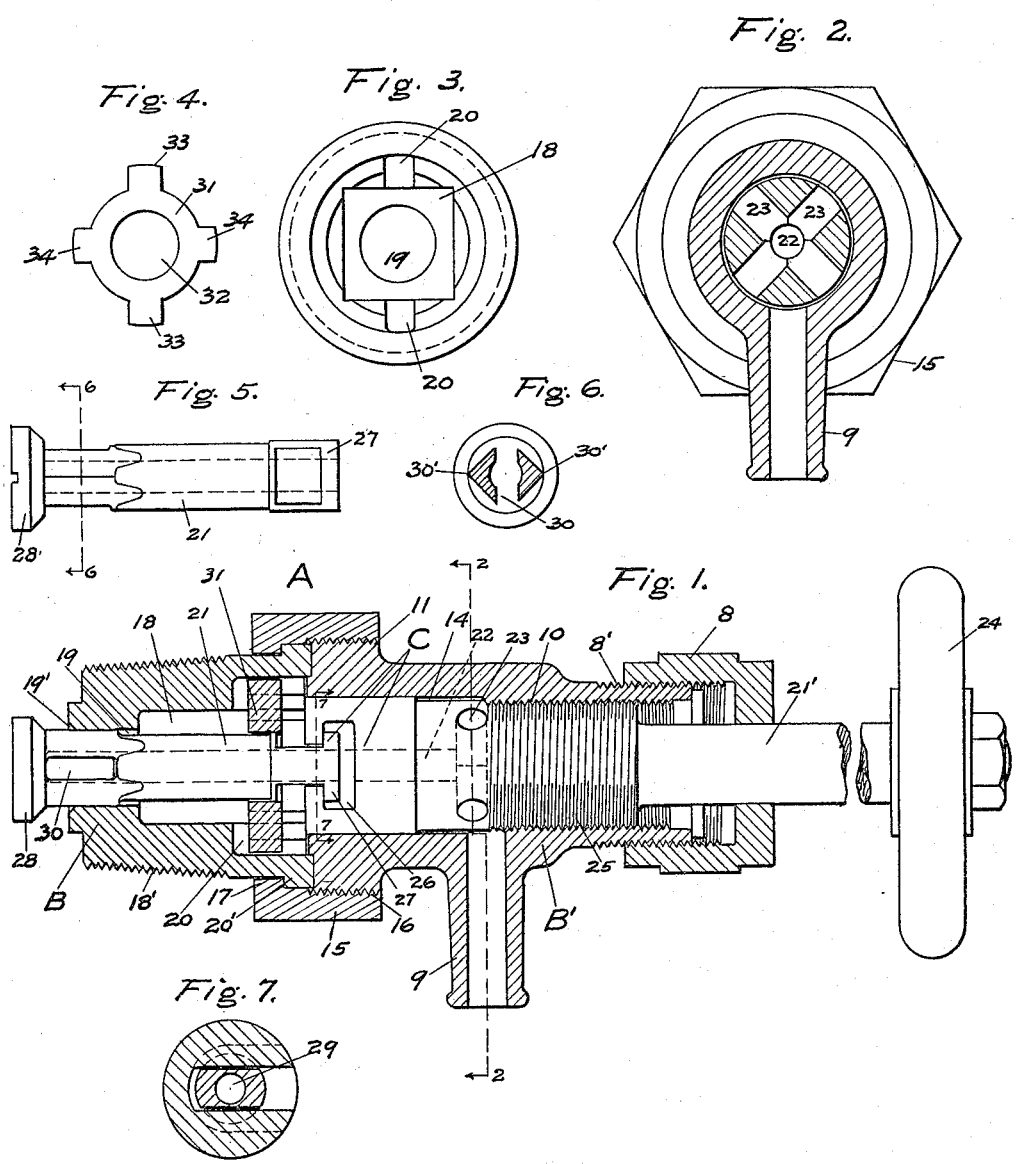

JAMES T. LANGLEY, OF PORTLAND, AND EDWIN THOMAS, OF LA GRANDE, OREGON.

GAGE-COCK.

1,149,374.  Specification of Letters Patent.  Patented Aug. 10, 1915.

Application filed December 14, 1914. Serial No. 877,153.

*To all whom it may concern:*

Be it known that we, JAMES T. LANGLEY and EDWIN THOMAS, citizens of the United States, the former residing at Portland, in the county of Multnomah, the latter at La Grande, in the county of Union, both in the State of Oregon, have jointly invented a new and useful Improvement in Gage-Cocks, of which the following is a specification, reference being had to the accompanying drawings.

Our invention relates to a class of cocks used in and with boilers or reservoirs, either for gaging, or to carry steam, gas, or other fluid from one place to another.

The object of our invention is to provide a gage-cock similar to that described in Letters Patent No. 1,051,899, heretofore issued to us on February 4, 1913, for an improvement in gage-cocks, and particularly for improvements of and upon the device in said patent described. We now propose to provide a different form and arrangement of the spindle members, the chambers within the body and a support-guide for the spindle member having the valve. The device we now propose is simpler, more cheaply constructed, provides a stronger spindle and is more accessible to clean.

We attain the foregoing objects, as well as other advantages, by the construction, combination and arrangement of parts, illustrated in the accompanying drawings which form a part hereof.

Figure 1 is a sectional view of the device longitudinally through its center. Fig. 2 is a sectional view on the line 2—2 of Fig. 1. Fig. 3 is an end view of the socket and support-guide ways of the end body member. Fig. 4 is a plan view of the support-guide. Fig. 5 is a longitudinal plan view of the valve member of the spindle. Fig. 6 is a sectional view of the same member on the line 6—6 of Fig. 5. Fig. 7 is a sectional view of the same on the line 7—7 of Fig. 1.

Like letters or numerals refer to like parts throughout the views where used as references.

A is the body of the gage-cock and is composed of two members B—B'.

8 is a threaded packing nut. The outer end of the member B' has a thread 8' to receive the nut 8.

9 is a lateral discharge outlet in the member B'. The member B' has an interior left hand thread 10 and an outer thread 11 near its joining end. It also has a cylindrical opening 14 extending from its joining end to the thread 10.

15 is a union nut, having an interior thread 16 adapted to engage the thread 11 of the member B', and an interior circular shoulder 17 adapted to engage the rim 20' of the member B.

The member B has a squared wrench socket 18 and a circular opening 19 in its free end which has a valve seat 19' therein. It also has longitudinal recesses or ways 20 extending from its joining end a suitable distance, the space from said joining end to the socket being of cylindrical form. The member B has an exterior thread 18' on its free end and an exterior rim 20' on the joining end.

C is a spindle comprising two members 21—21'. The member 21' has a longitudinal recess 22 extending from its joining end a suitable distance. It has also a plurality of lateral openings 23 from the recess 22 near its inner end. The outer end of the member 21' is squared and a hand wheel 24 is secured thereon. This member has an exterior left hand thread 25 adapted to engage the thread 10 of the member B'. It also has a cylindrical part beyond the said thread which terminates in a joining end having the female part 26 of a T joint. The spindle member 21 has at one end the male part 27 of a T joint adapted to engage the female part 26 of the other spindle member. The opposite end of this member 21 is formed as an integral valve 28. A longitudinal recess 29, Fig. 7, extends from the end of the member 21 to the valve. Adjacent to the valve are lateral openings 30 from the recess 29. At this place the valve is of rectangular shape having two corners 30', Fig. 6, adapted to engage the surface of the opening 19. The male and female parts 26 and 27 of the T joint of the valve spindle are formed as in the previous device, so that there is space about them to permit of a longitudinal play of the members 21—21', when they are rotated, to draw them apart, or together so they shall engage one another at the joint and, rotating in unison, cause the valve to open or close.

31 is a support guide, having a circular opening 32 through it, also two oppositely disposed lugs 33 adapted to slide through the recesses or ways 20 of the member B, and two other like disposed lugs 34 adapted to engage the interior surface of the member B.

It will now be seen that the thread 18' permits the member B to be secured within an opening in a boiler. This is accomplished by the use of a squared wrench inserted in the socket 18. The union nut 15 must be slipped over the member before it is placed in the boiler. The gage-cock is then assembled as shown in Fig. 1. It will be seen that upon rotating the hand wheel to the left the valve 28 rotates in its seat without leaving it until the play in the T joint is taken up when the valve opens. When the valve is closed by rotating the hand wheel to the right the reverse occurs. The valve rotates in its seat until the play in the joint is taken up and the spindle can rotate no farther. It will be seen that we can rotate the valve in its seat a pre-determined distance before it opens and after it closes which keeps it constantly ground to place and prevents extraneous matter coating or collecting on the valve or its seat.

It will be particularly noticed that a support guide 31 is now provided. The spindle member 21 rotates in the opening 19 and also in the guide 31 which retains it in alinement so that the valve will take its seat evenly and operate with the spindle member 21'. The member 21 having openings 30 near its end only, makes it stronger. The rectangular shape of this part of the member also allows its corners 30' to scrape the surface of the opening 19 keeping it free of scale. It will also be seen that the adjacent parts can be all removed while the member B is secured to the boiler with the valve in place on the spindle part 21 under pressure. The interior of the part 21 can then be easily cleaned as well as all remaining parts of the valve body and spindle. This is apparent because of the larger spaces afforded for access, the securing of the body together by the union nut and the socket which permits the member B to be secured in a boiler without injury to or disarrangement of other parts. It has been demonstrated by actual experience that the spindle member 21 must have sufficient metal and be formed to insure resistance to twisting, bending or breaking if an attempt is made to operate the valve. In the present device the steam or fluid passes, as will be seen upon opening the valve, through the openings 30 and through the spindle members 21 and 22 thence through the openings 23 and the outlet 9. In this device, the grinding of the valve in its seat is absolutely insured and it can be always turned therein even though fast with scale. This is accomplished by the direct transmission of motion to it with parts and the changed forms as shown.

Having thus described our invention we claim:

1. A gage-cock having therein a spindle comprising two members 21—21', the latter having the female part of a T joint on one end and a longitudinal recess extending from the joining end a suitable distance with lateral openings therein, means to retain the member 21' within the gage-cock in rotatable and longitudinally movable position, the member 21 being provided with an integral valve on one end and the male member of a T joint on its opposite end of a form to allow a longitudinal play between said members when joined, said member also having a longitudinal recess extending from its joining end to its valve, and lateral openings from said recess near the valve, and a support-guide formed and adapted to be received and retained in the gage-cock and to support and guide the member 21 therein in rotatable and longitudinally movable position and in alinement with the member 21' substantially as described.

2. A gage-cock having a body comprising two members, B—B', the former being arranged to receive a support-guide and a recessed, T-jointed spindle member in rotatable and longitudinally movable position, a valve seat in its free end, the member B' being arranged to receive and retain a T-jointed spindle member in rotatable and longitudinally movable position, means upon said members to engage a union nut, also a union nut, formed to engage and retain said members together when the said spindle members are assembled therein, substantially as described.

3. A gage-cock having a body comprising two members B—B' the former having a valve spindle bearing and a valve seat in its free end, and a chamber of larger size extending from the spindle bearing to the opposite end, said member being arranged to receive and retain therein a spindle support-guide and a recessed T-jointed spindle member in rotatable and longitudinally movable position, a support-guide formed and adapted to be received and retained in said member and to support and guide a T-jointed spindle member in rotatable and longitudinally movable position therein, the body member B' being arranged to receive and retain therein a recessed, T-jointed spindle member in rotatable and longitudinally movable position, substantially as described.

JAMES T. LANGLEY.
EDWIN THOMAS.

Witnesses:
J. F. PHY,
ALEX COCHRAN.